United States Patent [19]

Ellis et al.

[11] Patent Number: 4,806,377

[45] Date of Patent: Feb. 21, 1989

[54] WAXY CORN MASA BASED PRODUCTS AND METHODS OF MAKING

[75] Inventors: Eugene B. Ellis; Pete D. Friedemann, both of Grapevine; Richard W. Glass, College Station, all of Tex.

[73] Assignee: Frito-Lay, Inc., Dallas, Tex.

[21] Appl. No.: 106,672

[22] Filed: Oct. 8, 1987

[51] Int. Cl.$^4$ .............................................. A21D 10/00
[52] U.S. Cl. .................................... 426/549; 426/443; 426/458; 426/559; 426/560; 426/808
[58] Field of Search ............... 426/559, 549, 560, 439, 426/661, 443, 458, 808

[56] References Cited

U.S. PATENT DOCUMENTS

| | | | |
|---|---|---|---|
| 3,027,258 | 3/1962 | Markakis et al. | 426/540 |
| 3,083,103 | 3/1963 | Anderson et al. | 426/549 |
| 3,407,070 | 10/1968 | Murray et al. | 99/83 |
| 3,505,076 | 4/1970 | Maloney et al. | 99/81 |
| 3,652,294 | 3/1972 | Marotta et al. | 99/83 |
| 3,666,511 | 5/1972 | Williams et al. | 426/808 |
| 3,703,378 | 11/1972 | Bretch | 99/81 |
| 3,719,501 | 3/1973 | Rispoli et al. | 99/83 |
| 3,753,729 | 8/1973 | Harms et al. | 99/82 |
| 3,925,567 | 12/1975 | Abe | 426/559 |
| 4,073,957 | 2/1978 | Abe | 426/559 |
| 4,251,551 | 2/1981 | Van Hulle et al. | 426/94 |
| 4,409,250 | 10/1983 | Van Hulle et al. | 426/242 |

OTHER PUBLICATIONS

Crookston, K. R.; "The Story of Waxy Corn", Crops and Soils Magazine, Aug./Sep. 1979, pp. 11–13.
Arenson, S. W.; "Predict Ingredient Performance", Food Engineering, Oct. 1969, pp. 150–154.
Feldberg C.; "Extruded Starch—Based Snacks", Cereal Science, Today, vol. 14, No. 6, Jun. 1969, pp. 211–214.

*Primary Examiner*—Donald E. Czaja
*Assistant Examiner*—Helen Pratt
*Attorney, Agent, or Firm*—Thomas P. Schur

[57] ABSTRACT

Novel products, such as snack foods, are disclosed that comprise waxy corn masa and have unique textures, as well as processing procedures adaptable to waxy corn masa that permit the production of low-oil content products.

52 Claims, No Drawings

WAXY CORN MASA BASED PRODUCTS AND METHODS OF MAKING

FIELD OF THE INVENTION

The present invention relates to novel products derived from waxy corn. The invention specifically relates to snack food products that comprise waxy corn masa and to the methods by which such products are made, including baked, low-oil snack food products that comprise waxy corn masa.

BACKGROUND OF THE INVENTION

Corn is a major food staple that has been continuously refined through the development of hybrid varieties. To date the ovewhelming majority of corn grown is dent corn. Dent corn is characterized by a starch composition that is about seventy-five percent amylopectin and about twenty-five percent amylose. Amylopectin is a branch-chained polysaccharide, whereas amylose is a straight-chain polysaccharide. Hybrid corns are available wherein the starch composition is essentially all amylopectin. These hybrids are referred to as waxy corns. The varying amounts of amylopectin and amylose in the starch compositions of dent and waxy corns produce substantially different characteristics. Thus, dent and waxy corns are not considered to be interchangeable materials for most applications.

To date, waxy corn is utilized in food products only to the extent that various wet milling tecniques, well-known to those skilled in the art, are used to isolate amylopectin starch from the corn, which starch alone is used as a raw ingredient for foods. Generally these wet milling techniques include grinding, flotation to remove the germ of the kernels, screening to remove fiber, and centrifugation to separate protein from starch.

Numerous examples may be cited where amylopectin starch is isolated from waxy corn and then incorporated into food products. The isolated amylopectin starch is recognized to form heavy-bodied pastes that are sensitive to shear. The pastes possess high clarity and reduced gelation tendency.

U.S. Pat. No. 3,027,258, to Markakis et al., describes a synthetic chip-type food product obtained from a dough comprising between forty-four and sixty-three weight percent gelatinized amylopectin and between twenty and twenty-five weight percent vital gluten, the balance being inert ingredients such as amylose starch fragments of wheat, corn, potato or tapioca starch.

In U.S. Pat. No. 3,407,070, to Murray et al., there are disclosed ready-to-eat food products which comprise a farinaceous base and a high amylose starch product. The farinaceous base may be a low amylose starch such as that derived from waxy maize. Murray et al. specifically state that the low amylose (high amylopectin) starch does not, by itself, produce a satisfactory food product, but rather a product displaying defects such as poor shaping, poor extrusion handling, poor set, fragile texture and lack of crispiness when cooked. Thus, Murray et al. teach away from the use of a predominant amount of starch derived from waxy corn as a raw material for read-to-eat food products.

Marotta et al. disclose in U.S. Pat. No. 3,652,294, a process for preparing a ready-to-eat food product having, as a major component, a pre-gelatinized starch containing no more than five weight percent vital gluten, which starch may be waxy maize starch. The major component starch is present in an amount of at least fifty weight percent of the total food product. Other components include colorants and flavorants as well as cereal starches. The claimed process includes the step of mixing a dry pregelatinized starch with between eighteen and thirty weight percent water prior to compressing the blend into a shape.

As can be seen from the above references, the utilization of waxy corn as a food product has been generally limited. What is lacking in the area of waxy corn utilization are food products that are predominantly based on waxy corn and that incorporate about the whole waxy corn kernel, as well as efficient processes for the production of such waxy corn products.

Thus, it is one object of the present invention to provide novel food products that predominantly comprise waxy corn.

It is a second object of the present invention to provide novel food products that incorporate about the whole waxy corn kernel.

It is yet another object of the present invention to provide processes for making novel food products that incorporate about the whole waxy corn kernel in the product.

These and other objects of the invention will become apparent from the following description and the appended claims.

SUMMARY OF THE INVENTION

The present invention discloses a cooked food product comprising waxy corn masa. The cooked food product may comprise a blend of dent and waxy corn masa or may be a product wherein no dent corn masa is present. In preferred embodiments the food product is a baked snack food product comprising waxy corn masa or a blend of dent and waxy corn masa and having an oil content ranging from about two to about thirty weight percent, based on the total weight of the baked food product.

The invention also relates to a process of making a cooked food product from waxy corn masa, which process includes the steps of obtaining a waxy corn masa, forming the masa into a desired shape and cooking the shaped masa for a time sufficient to reduce the moisture content of the masa shape to less than two weight percent, based on the total weight of the product.

DETAILED DESCRIPTION OF THE INVENTION

In accordance with the present invention there is provided a simple process for the manufacture of waxy corn masa-based food products having unique characteristics. Waxy corn is identified by kernels having a starch composition that is about one hundred percent amylopectin, or branch-chained, starch. This high amylopectin trait is attributed to the presence of a double recessive gene in the corn's genetic profile. Waxy corn may exist having white or yellow kernels or a mixture of white and yellow kernels.

To form a masa, waxy corn kernels are heated either in a batch or continuous process in an aqueous calcium hydroxide solution to a temperature of between about 82° C. and 100° C. (180° F. and 212° F.). The aqueous calcium hydroxide solution is between about 0.5 and 3.0 weight percent calcium hydroxide, based on the weight of the corn. The mixture is kept at the above-mentioned elevated temperature for a short period of time, less than one hour. Water is added to reduce the temperature of the mixture to below the starch gelatinization temperature and the corn is allowed to soak until a desired kernel moisture content is reached. Waxy corn kernels cook in an appreciably shorter period than dent corn. Whereas dent corn kernels require heating to between about 82° C. and 100° C. (180° F. and 212° F.) for about thirty minutes and soaking for between twelve and sixteen hours to achieve about a fifty percent moisture gain, waxy kernels achieve about the same moisture gain when heated to the same temperature range for between three and fifteen minutes and soaked for between twelve and sixteen hours. As the processing conditions for waxy corn masa is significantly shorter than the processing time for dent corn masa, waxy corn has an inherent processing advantage.

After cooling, the kernels are removed from the calcium hydroxide solution. The kernels may optionally be washed to remove the pericarp, which has been softened by soaking in the calcium hydroxide solution. The waxy corn kernels can then be ground in a mill to produce the wet-ground product known as masa. Masa contains between about forty weight percent and sixty-five weight percent moisture, based on the total weight of the masa. The exact moisture content can be controlled by adding water during grinding, and is important, as recognized by those skilled in the art, for determining the characteristics of the final product.

The dry weight of waxy corn masa comprises from about one to about seven weight percent oil, from about seventy-six to about ninety-one weight percent amylopectin starch, and from about eight to about fifteen weight percent protein. From zero to about two percent of dry waxy corn comprises fiber.

Waxy corn masa is suitable for direct processing into a food product or may be dried, stored and reconstituted at a later time.

In keeping with the present invention, the masa is next formed into a shape. This may be accomplished by any of the techniques familiar to those skilled in the art of shaping masa and similar-type compositions. Examples include extruding the waxy corn masa as a collet, pellet or flat ribbon and sheeting the waxy corn masa.

Moisture is removed from the shaped waxy corn masa by cooking. Cooking is accomplished by any method wherein heat is applied to reduce the moisture content of the shaped masa. One or more cooking steps are used to reduce the moisture content of the masa, preferably to less than two weight percent based on the total weight of the final food product. Frying and baking are two examples of cooking to reduce the moisture content. After cooking, additional ingredients of the food product, such as oils, fillings, salt and seasonings, may be added to the product.

Various embodiments of waxy corn masa based-food products are suitable for consumption as snack foods. The masa can be extruded as a ribbon, fried in hot oil, salted and seasoned to yield a corn chip. A crispy tortilla chip can be obtained if the masa is milled and sheeted to a thickness of between 0.75 and 1.30 millimeters, toasted and fried. Waxy corn masa can also be used to form a thickened tortilla chip, referred to as a sopapilla, by sheeting the masa to a greater thickness, more than about 1.30 millimeters, toasting and frying. Waxy corn masa, unlike dent corn masa, is also amenable to baking to yield a very tender low oil snack food product is contrasted to dent corn masa which becomes hard and unpalatable at such low oil levels. An extruded or sheeted shape can be baked to reduce the moisture content of the shape to less than about two weight percent. The oil content of the baked product, derived from the oil inherent to the masa, will be in the range of from about one to about seven weight percent, based on the total weight of the baked product. For enhanced organoleptic appeal, additional oil, preferably between about five and thirty weight percent may be applied to the baked product, such as by a spray process. More preferably, between about five and fifteen weight percent oil is applied to the baked product; and most preferably between about five and ten weight percent oil is applied. Additional ingredients such as salt, seasonings, fillings, flavorants and colorants may also be applied to the product. These additional ingredients may contain some amount of oil and contribute to the final oil content of the product.

The snack food products obtainable by processing waxy corn masa may be provided in any desired shape. Examples include flat chips, solid rods and collets. In the example of a collet, the center, or hollow portion of the shape, can be filled with a second material such as a sweet or savory filling. A sweet or savory filling may also be sandwiched between two flat chips made from the waxy corn masa.

The products made from waxy corn masa have characteristics that readily identify them as such. The texture of a fried waxy corn masa product is typically seen to be more tender than the texture of a similar product made from dent corn masa. Waxy corn masa can also be baked, as described above, to produce a tender-textured product whereas a similar baked dent corn masa product is hard-textured and unpalatable.

Waxy corn masa based products also have a faster speed of meltdown when eaten than similar products made from dent corn masa. The highly branched amylopectin starch content of waxy corn masa is more susceptible to the action of amylase enzymes in the saliva and results in a more rapid hydrolysis of structure than the amylose-amylopectin starch content of dent corn masa.

The present invention also includes food products comprising blends of waxy corn masa and dent corn masa. Blends of these masas can be used to adjust the texture of the food product derived therefrom, and so, enable one to produce a product having a desired texture. In producing such blends, the different parameters for forming waxy corn masa and dent corn masa must be considered. Generally, it is desired that each masa have about the same moisture content, necessitating that each masa be separately prepared prior to blending. If varying moisture content is not critical then the waxy and dent corns may also be blended prior to forming a masa.

Blends of waxy and dent corn masas are advantageously used to compensate for any shortcomings that may occur when waxy corn masa alone is used. As an example, white waxy corn masa produces a cooked food product that is tender, but not having a colorful appeal to the consumer. A blend of about one part white waxy corn masa and one part yellow dent corn masa retains the tender texture of the so-formed food product and also possesses a golden color that is appealing to the consumer.

Preferably, when blends of waxy and dent corn masas are used to produce a food product in accordance with the present invention, the ratio of waxy corn masa to dent corn ranges from about 10:1 to about 1:10. More preferably, the ratio of waxy corn masa to dent corn masa ranges from about 3:2 to about 2:3 and most preferably is about 1:1.

EXAMPLES

The following examples are provided to more clearly illustrate the subject mentioned. Such examples are intended to be illustrative of the invention, and not to be, in any way, limitative of the invention.

EXAMPLE 1

In this Example, the reduced time needed to prepare waxy corn prior to forming a masa is illustrated. Two corn samples were obtained from the Vineyard Seed Company, Champaign, Ill., differing only in that one sample, Vexp 4167, contained a double recessive allele at the waxy locus which induces waxy characteristics, while the second sample, V58w, contained a double dominant allele at the waxy locus, and so was the corresponding dent corn variety. Only undamaged whole kernels were used in this example. Each sample was soaked under similar conditions and monitored for moisture pick up.

About one hundred grams of corn kernels to be tested, about one gram of calcium hydroxide and about 300 ml. of distilled water were mixed in a 600 ml. beaker. This aqueous mixture was heated in about fourteen minutes to its boiling point and allowed to boil for about six minutes. Thereafter, the mixture was cooled to about 65° C. (149° F.) by the introduction of additional water and placement of the mixture in a 65° C. (149° F.) forced air oven for about three hours. The mixture was then allowed to stand at room temperature for about twelve hours. The mixture was next poured over a #10 U.S. Standard sieve. The cooked, soaked corn was washed under a 20 psi stream of water and dried in a forced air oven maintained at about 120° C. (248° F.) for about 42 hours.

The average percent moisture in the waxy corn variety was found to be about 49.36 percent with a standard deviation of 0.05. The average percent moisture in the corresponding dent corn sample was about 45.66 percent, with a standard deviation of 0.15. Thus, it is seen that a waxy corn variety is capable of increasing moisture uptake when compared to its dent corn counterpart under identical circumstances. In products utilizing mixtures of dent and waxy corn masa, the dent and waxy corn masa components may be prepared together, but preferably the waxy component is prepared separately from the dent corn component to obtain equal moisture contents in the two masas.

EXAMPLE 2-6

The following examples demonstrate the utilization of waxy corn masa to produce corn-based food products having unique characteristics. In each of the following examples white waxy corn, obtained from the Vineyard Seed Company and identified as Vexp 4167, was processed to masa in the following manner: about 45.4 kilograms of the white waxy corn was dispersed into about 106 liters of a one percent calcium hydroxide solution. In Examples 2 and 3, the mixture was heated to boiling and maintained there for about fifteen minutes. In Examples 4 through 6, the mixture was kept at boiling temperature for about five minutes. Each mixture was then allowed to cool to room temperature over a period of about twelve to sixteen hours. After cooling, the corn was removed from the calcium hydroxide solution and washed with water to remove the pericarp from each kernel. The kernels were then injected into the center of a wet grinding mill which utilized two twelve-inch diameter grinding stones for the products of Examples 2 and 3, and two fourteen-inch diameter grinding stones for the products of Examples 4 through 6. The masas exiting from the mill were collected and found to have between about forty-eight and fifty-two weight percent moisture, based on the total weight of the so-formed masas.

The textures of the products made in examples 2-6 which follow were measured on a TG4C Texturegage manufactured by Food Technology Corporation, Rockville, Md. This device measures texture by the force per unit weight required to break the product, and is reported in pounds-force per gram (lb/gm).

EXAMPLE 2

This example describes corn chips made from waxy corn masa. The waxy corn masa, prepared as described above, was extruded through rectangular orifices, about 1.3 millimeters high and 15.9 millimeters wide. The extrudate was cut at about five centimeter intervals and allowed to fall into frying oil maintained at about 210° C. (410° F.) for from about sixty to ninety seconds. Once removed from the frying oil, the corn chips were flavored with salt and seasonings. The average texture of these chips was found to be about 29.9 lb/gm. This compares to an average texture measurement of 36 lb/gm for dent corn masa extruded through the same size die, or about 20% harder texture than its waxy corn counterpart.

EXAMPLE 3

In this example, waxy corn masa was extruded to form a hollow elbow macaroni shape. The masa was extruded through a die having a circular opening of about 7.1 millimeters with a pinion-type insert slightly off center such that as masa was pushed through the opening, it extruded at a faster rate on one side than the other and so curled to an elbow shape. The extrudate was cut off with a rotating cutter at about 2.5 centimeter lengths and allowed to drop into hot frying oil maintained at about 210° C. (410° F.). After frying, the elbow-shaped products were flavored with salt and other seasonings. The average texture of this product was found to be about 25.0 lb/gm.

EXAMPLE 4

Tortilla chip products made from waxy corn masa are disclosed in this example. Waxy corn prepared as described above was sheeted to a thickness of between about 0.9 and 1.27 millimeters. The sheeted masa was toasted at about 260° C. (500° F.) for from about sixteen to twenty seconds, conditioned for about three minutes at ambient temperature, and fried in oil at about 190° C. (374° F.), for about sixty seconds. The fried product was flavored with salt and other seasonings.

The tortilla chips made from waxy corn masa were found to have a texture measurement of about 24.9 lb/gm as compared to about 46 lb/gm for a corresponding tortilla chip made from dent corn masa.

The waxy corn masa and dent corn masa tortilla chips of this example were submitted to a sensory attribute panel of thirty people. Characteristics measured included color, texture, crispness, speed or meltdown, toothpacking, mouthfeel and corn flavor. The results of this panel test are presented below in Table 1.

TABLE 1

| Characteristic | Yellow Dent Corn Masa Based Tortilla Chip (Mean Score) | White Waxy Corn Based Tortilla Chip (Mean Score) |
|---|---|---|
| Sensory Characteristics of Waxy Corn Masa Product | | |
| Color (Light-Dark) | 5.3 | 3.2 |
| Texture (Tender-Tough) | 5.2 | 4.1 |
| Crispness (Not Crispy-Very Crispy) | 6.6 | 6.3 |
| Speed of Meltdown (Slow-Fast) | 4.9 | 6.4 |
| Toothpacking (No Accumulation-Much) | 5.2 | 5.8 |
| Mouthfeel (Smooth-Gritty) | 5.2 | 5.0 |
| Corn Flavor (Bland-Flavorful) | 6.0 | 4.5 |

As can be seen from this table, the tortilla chips made from white waxy corn were determined to be significantly lighter in color, more tender and to have faster meltdown and blander flavor than corresponding tortilla chips derived from dent corn masa. No significant difference was detected with respect to characteristics of crispness, toothpacking and mouthfeel. The differences in texture and speed of meltdown are especially characteristic of these waxy corn products.

EXAMPLE 5

This example describes a modified process to produce a low oil tortilla chip utilizing waxy corn masa. The waxy corn masa prepared as described earlier was sheeted to a thickness of about 1.0 millimeter. The masa was measured to contain about three weight percent oil in its composition. The sheeted masa was toasted at about 245° C. (473° F.) for about fifteen seconds and allowed to condition at ambient temperature for about two minutes. The sheeted and toasted product was then baked in an oven at about 180° C. (356° F.) for about three minutes in a monolayered fashion. After baking, the product was found to have a moisture content of less than two weight percent. To increase the organoleptic characteristics of the product, between about four and five weight percent oil was sprayed onto the tortilla chips, bringing the total oil content to between seven and eight weight percent based on the final weight of the tortilla chip. Salt and additional seasonings were also applied to the tortilla chip.

A low oil content waxy corn masa product could also be obtained by flashfrying the sheeted product at about 207° C. (405° F.) for a period of only between about seven and ten seconds after drying at 180° C. (356° F.) for about three minutes.

EXAMPLE 6

The low oil product described in Example 5 was also sheeted to a thickness of between about 2.0 and 3.0 millimeters. This sheeted waxy corn masa was toasted at about 260° C. (500° F.) for about fifteen seconds, conditioned in air for about three minutes and thereafter baked at about 180° C. (356° F.) for about 3 minutes in a monolayer fashion. The masa expands on baking to form a puffed product. This tortilla chip is also referred to as a sopapilla. The resultant low oil product was additionally oil sprayed, salted and seasoned to increase its organoleptic characteristics. Dent corn masa cannot be similarly processed and retain palatable characteristics.

EXAMPLE 7

The process for making a low oil tortilla chip by baking, as described earlier and illustrated in Example 5, was used to make a series of products having dent and waxy corn masa blends. The five product blends ranged in twenty-five percent increments from 100% waxy corn masa to 100% dent corn masa. In these products, the waxy corn was a white waxy variety and the dent corn was a yellow dent variety.

The waxy and dent masas were separately prepared, then used in measured blends in accordance with the teaching in Example 5 to produce baked tortilla chip products. The baked products were sprayed with about ten weight percent oil and seasoned with about 3.2 weight percent sweet corn seasonings.

The products were then evaluated in an organizational multitest consisting of 109 respondents. Each respondent evaluated three of the five available products in a balanced incomplete block design. The results of this test are presented below in Table 2.

TABLE 2

Results of Organizational Multitest for Low-Oil, Baked Waxy/Dent Masa Blends

| | PERCENT WHITE WAXY MASA: | | | | |
|---|---|---|---|---|---|
| | 100 | 75 | 50 | 25 | 0 |
| | | | MEAN | | |
| Overall Acceptability (9) | 5.3 | 6.3 | 6.5 | 6.5 | 5.3 |
| Appearance Acceptability (9) | 4.7 | 6.1 | 6.2 | 6.5 | 6.2 |
| Color Acceptability (9) | 4.1 | 5.7 | 5.9 | 6.3 | 6.5 |
| Color Intensity (5) | 2.4 | 3.3 | 4.0 | 4.1 | 4.7 |
| Texture Acceptability (9) | 5.7 | 6.7 | 6.8 | 6.8 | 6.0 |
| Hardness (5) | 4.2 | 4.6 | 4.9 | 5.3 | 5.6 |
| Crispness (5) | 4.3 | 4.5 | 4.7 | 4.9 | 4.9 |
| Flavor Acceptability (9) | 4.2 | 6.0 | 6.1 | 6.5 | 5.3 |
| Corn Flavor Intensity (5) | 3.9 | 4.5 | 4.6 | 5.0 | 4.7 |
| Overall Flavor Intensity (5) | 3.6 | 4.5 | 4.3 | 4.9 | 4.5 |

Regression analyses were performed on overall acceptability, texture acceptability, and flavor acceptability versus percent white corn. All three analyses were significant. The $R^2$ for overall acceptability is 0.96, for texture acceptability is 0.97, and for flavor acceptability is 0.83.

These analyses of consumer preferences predicted optimum values of percent waxy corn masa in the product to be 49% for overall acceptability, 47% for texture acceptability and 47% for flavor acceptability. The three measures are in close proximity to each other. A blend of about one-half white waxy corn masa and one-half yellow dent masa should yield a product having these three characteristics about optimized.

EXAMPLE 8

The rates at which waxy corn masa and dent corn masa exhibit starch hydrolysis by salivary alpha amylase are depicted in this example. Low-oil tortilla chips produced in accordance with the method taught in Example 5 were examined to observe their "meltdown" characteristics under conditions simulating the environment such products are subjected to when eaten. The masa used to prepare the chips varied from an all-waxy corn masa, to a blend of one-half waxy corn and one-half dent corn, to an all-dent corn masa. Waxy corn contains a greater proportion of amylopectin (which is more susceptible than amylose to alpha amylase hydrolysis) than dent corn. When samples containing varying levels of waxy corn were treated with salivary alpha amylase solutions, digestion and dissociation of the samples were more rapid with higher waxy corn content.

Each sample was evaluated in the following manner:

A solution of about 5 ml. of salivary alpha amylase dissolved in about 35 ml. of 0.2M NaCl was added to a flask containing about 1.2 grams of sample product. The flask was vibrated at room temperature for about 30 minutes after which about 30 ml. of liquid was removed from the flask and centrifuged for about 3 minutes. The supernatant was filtered and about 10 ml. of the filter solution was combined with about 10 ml. of deionized water, 2.5 ml. acetate buffer, and 2.5 ml. of glucoamylase solution. The glucoamylase solution was obtained by dissolving about 7.5 ml. of Diazyme L-200, a product of Miles Laboratory, Biotech Products Division, into about 42.5 ml. of water. The above solution was placed in a 40° C. shaker water bath for about 30 minutes after which 3.2 ml. of trichloro-aecetic acid solution was added to stop the glucoamylase action. The liquid was diluted with a phosphate buffer solution and the glucose content of the liquid detected with a Model 27 YSI Starch Analyzer, manufactured by the Yellow Springs Instrument Company, Yellow Springs, Ohio, and calibrated with a 200 mg/dl glucose solution.

The average milligrams of glucose produced per decaliter per gram of sample calculated as mean values from six repetitions of each sample were as follows: products having all-waxy corn masa—154.4; products having one-half waxy corn masa and one-half dent corn masa—135.3; products having all dent corn masa—64.7. Thus, the presence of waxy corn masa significantly increased the starch hydrolysis of samples as compared to an all-dent corn masa counterpart. The starch hydrolysis rate of a blend of one-half waxy corn masa and one-half dent corn masa was about 38% higher than its all-dent corn counterpart. The starch hydrolysis rate of an all-waxy corn masa product was about 54% higher than its all-dent corn counterpart.

The above examples demonstrate that waxy corn masa can be used in a simplified process to produce food products having unique characteristics. The use of waxy corn reduces the soak time necessary prior to forming a masa. Snack food products derived from waxy corn masa are more tender and digestible than their dent corn counterparts. In addition, waxy corn masa can be used to produce low oil baked products not obtainable in acceptable taste and texture from a dent corn masa.

Inasmuch as the present invention is subject to many variations, modifications and changes of detail, a number of which have been expressly stated herein, it is intended that all matter described throughout this specification be interpreted as illustrative and not in a limiting sense. The scope of the invention is intended to include all modifications and variations that fall within the scope of the attached claims.

I claim:

1. A cooked food product comprising waxy corn masa.

2. The product in accordance with claim 1 wherein said product contains less than two percent moisture.

3. The product in accordance with claim 1 wherein said product is a fried food product.

4. The product in accordance with claim 1 wherein said product is a baked food product.

5. The product in accordance with claim 1 wherein said product is a snack food.

6. The product in accordance with claim 5 wherein said snack food is formed into a ribbon, collet, pellet or chip.

7. The snack food in accordance with claim 6 wherein said collet has a filling therein.

8. The snack food in accordance with claim 7 wherein said filling is selected from the group consisting of savory and sweet fillings.

9. The snack food in accordance with claim 5 wherein said snack food is a corn chip.

10. The snack food in accordance with claim 5 wherein said snack food is a tortilla chip.

11. The snack food in accordance with claim 5 wherein said snack food is a sopapilla.

12. A fried snack food product comprising waxy corn masa.

13. A baked snack food product comprising waxy corn masa.

14. The baked snack food product in accordance with claim 13 wherein said product additionally comprises at least one ingredient selected from the group consisting of salt, seasonings, fillings, flavorants and colorants.

15. The baked snack food product in accordance with claim 13 wherein the oil content of said product ranges from two to thirty weight percent based on the total weight of the product.

16. The baked snack food product in accordance with claim 13 wherein the oil content of said product ranges from five to fifteen weight percent based on the total weight of the product.

17. The baked snack food product in accordance with claim 13 wherein the oil content of said product ranges from five to ten weight percent based on the total weight of the product.

18. The baked snack food product in accordance with claim 13 wherein the moisture content of said product is less than or equal to about two percent.

19. A cooked food product comprising a blend of waxy corn masa and dent corn masa.

20. The cooked food product in accordance with claim 19 wherein the ratio of waxy corn masa to dent corn masa ranges from 10:1 to 1:10.

21. The cooked food product in accordance with claim 19 wherein the ratio of waxy corn masa to dent corn masa ranges from 3:2 to 2:3.

22. The cooked food product in accordance with claim 19 wherein the ratio of waxy corn masa to dent corn masa is about 1:1.

23. The cooked food product in accordance with claim 19 wherein the moisture content of said product is less than or equal to about two weight percent.

24. The cooked food product in accordance with claim 19 wherein said product is a snack food.

25. The cooked food product in accordance with claim 19 wherein said snack food is formed into a ribbon, collet, pellet or chip.

26. The cooked food product in accordance with claim 19 wherein said collet has a filling therein.

27. The cooked food product in accordance with claim 19 wherein said filling is selected from the group consisting of savory and sweet fillings.

28. The cooked food product in accordance with claim 19 wherein said snack food is a corn chip.

29. The cooked food product in accordance with claim 19 wherein said snack food is a tortilla chip.

30. The cooked food product in accordance with claim 19 wherein said snack food is a sopapilla.

31. A fried snack food product comprising a blend of waxy corn masa and dent corn masa.

32. A baked snack food product comprising a blend of waxy corn masa and dent corn masa.

33. The baked snack food product in accordance with claim 32 wherein said product additionally comprises at least one ingredient selected from the group consisting of salt, seasonings, fillings, flavorants and colorants.

34. The baked snack food product in accordance with claim 32 wherein the oil content of said product ranges from two to thirty weight percent based on the total weight of the product.

35. The baked snack food product in accordance with claim 32 wherein the oil content of said product ranges from five to fifteen weight percent based on the total weight of the product.

36. The baked snack food product in accordance with claim 32 wherein the oil content of said product ranges from five to ten weight percent based on the total weight of the product.

37. The baked snack food product in accordance with claim 32 wherein the moisture content of said product is less than or equal to about two percent.

38. A process for making a cooked food product from waxy corn masa, which process includes the steps of obtaining a waxy corn masa, forming the masa into a desired shape and cooking the shaped masa for a time sufficient to reduce the moisture content of the masa shape to less than 2 weight percent, based on the total weight of the product.

39. The process in accordance with claim 38 wherein said cooking is accomplished by frying.

40. The process in accordance with claim 38 wherein said cooking is accomplished by baking.

41. The process in accordance with claim 38 wherein said process additionally includes the step of adding at least one ingredient selected from the group consisting of salt, seasonings, fillings, flavorants and colorants.

42. The process in accordance with claim 38 wherein said process additionally comprises adjusting the oil content of said product to between from 2 to 30 weight percent based on the total weight of the product.

43. The process in accordance with claim 38 wherein said process additionally comprises adjusting the oil content of said product to between from 5 to 15 weight percent based on the total weight of the product.

44. The process in accordance with claim 38 wherein said process additionally comprises adjusting the oil content of said product to between from 5 to 10 weight percent based on the total weight of the product.

45. A process of making a cooked food product from waxy corn masa, which process includes the steps of obtaining a masa blend of waxy corn masa and dent corn masa, forming the blend into a desired shape and cooking the shaped masa blend for a time sufficient to reduce the moisture content of the masa blend shape to less than 2 weight percent, based on the total weight of the product.

46. The process in accordance with claim 45 wherein said waxy corn masa and said dent corn masa are separately formed prior to blending.

47. The process in accordance with claim 45 wherein said cooking is accomplished by frying.

48. The process in accordance with claim 45 wherein said cooking is accomplished by baking.

49. The process in accordance with claim 45 wherein said process additionally includes the step of adding at least one ingredient selected from the group consisting of salt, seasonings, fillings, flavorants and colorants.

50. The process in accordance with claim 45 wherein said process additionally comprises adjusting the oil content of said product to between from 2 to 30 weight percent based on the total weight of the product.

51. The process in accordance with claim 45 wherein said process additionally comprises adjusting the oil content of said product to between from 5 to 15 weight percent based on the total weight of the product.

52. The process in accordance with claim 45 wherein sid process additionally comprises adjusting the oil content of said product to between from 5 to 10 weight percent based on the total weight of the product.

* * * * *